United States Patent
Kim et al.

(10) Patent No.: US 7,685,625 B2
(45) Date of Patent: Mar. 23, 2010

(54) IMAGE REPRODUCING APPARATUS FOR CHANNEL MAP UPDATING AND METHOD THEREOF

(75) Inventors: Do-young Kim, Suwon-si (KR); Eun-kyung Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1120 days.

(21) Appl. No.: 11/266,394

(22) Filed: Nov. 4, 2005

(65) Prior Publication Data

US 2006/0184964 A1     Aug. 17, 2006

(30) Foreign Application Priority Data

Feb. 17, 2005     (KR)    ............... 10-2005-0013280

(51) Int. Cl.
*H04N 7/16*    (2006.01)
(52) U.S. Cl. ............... 725/151; 725/6; 725/22; 725/25; 725/39; 725/56
(58) Field of Classification Search ............ 725/6, 725/22, 25, 39, 56, 151
See application file for complete search history.

(56) References Cited

U.S. PATENT DOCUMENTS

| | | | | |
|---|---|---|---|---|
| 6,160,545 A * | 12/2000 | Eyer et al. | ............ | 715/721 |
| 6,263,387 B1 * | 7/2001 | Chrabaszcz | ............ | 710/302 |
| 6,718,552 B1 * | 4/2004 | Goode | ............ | 725/95 |
| 7,124,938 B1 * | 10/2006 | Marsh | ............ | 235/382 |
| 7,398,544 B2 * | 7/2008 | Candelore et al. | ............ | 726/2 |
| 2002/0020745 A1 * | 2/2002 | Yap et al. | ............ | 235/451 |
| 2002/0158810 A1 * | 10/2002 | Blotky et al. | ............ | 345/1.1 |
| 2002/0178455 A1 * | 11/2002 | Poli et al. | ............ | 725/109 |
| 2004/0187168 A1 * | 9/2004 | Shintani et al. | ............ | 725/153 |
| 2005/0027986 A1 * | 2/2005 | Thomas et al. | ............ | 713/176 |
| 2005/0097594 A1 * | 5/2005 | O'Donnell et al. | ............ | 725/15 |
| 2005/0102702 A1 * | 5/2005 | Candelore et al. | ............ | 725/100 |
| 2005/0147247 A1 * | 7/2005 | Westberg et al. | ............ | 380/200 |
| 2006/0023881 A1 * | 2/2006 | Akiyama et al. | ............ | 380/210 |
| 2006/0053446 A1 * | 3/2006 | Kim et al. | ............ | 725/39 |

FOREIGN PATENT DOCUMENTS

JP     2002-044638 A     2/2002

(Continued)

*Primary Examiner*—Christopher Kelley
*Assistant Examiner*—Sahar A Baig
(74) *Attorney, Agent, or Firm*—Sughrue Mion, PLLC

(57) ABSTRACT

Disclosed is an image reproducing apparatus for updating a channel map, and a method thereof. The image reproducing apparatus includes an identification (ID) detector for detecting the ID of a broadcast information card when a broadcast information card is mounted, a comparing unit for comparing the ID of the broadcast information card detected by the detector with the ID of a existing broadcast information card, the ID being received from a broadcast station and stored in a storage unit, a deleting unit for deleting an existing first channel map when the ID of the detected broadcast information card is different from the ID of the existing broadcast information card, and a receiving unit for receiving data including a new second channel map from the broadcast station in place of the first channel map deleted by the deleting unit. Accordingly, accurate update conditions are proposed, thereby enhancing user convenience and increasing accuracy.

10 Claims, 2 Drawing Sheets

FOREIGN PATENT DOCUMENTS

| | | |
|---|---|---|
| JP | 2004-056654 A | 2/2004 |
| KR | 2000-0034254 A | 6/2000 |
| KR | 10-2002-0079270 A | 10/2002 |
| KR | 10-2003-0047253 A | 6/2003 |
| KR | 10-2004-0079497 A | 9/2004 |
| KR | 10-2004-0080018 A | 9/2004 |

* cited by examiner

IMAGE REPRODUCING APPARATUS FOR CHANNEL MAP UPDATING AND METHOD THEREOF

CROSS-REFERENCE TO RELATED APPLICATIONS

This application claims priority from Korean Patent Application No. 10-2005-0013280, filed on Feb. 17, 2005, the entire content of which is incorporated herein by reference.

BACKGROUND OF THE INVENTION

1. Field of the Invention

The present invention relates to an image reproducing apparatus and a method of updating a channel map. More specifically, the invention relates to an image reproducing apparatus for channel map updating and a method thereof.

2. Description of the Related Art

Since television (TV) signals first started to be transmitted, apparatuses for receiving these TV signals called TVs have spread more quickly than any other conventional medium, and vast amounts of broadcast content have been produced.

In addition, the role of TV in contributing to the transfer of knowledge and information sharing cannot be overlooked by any means. However, producing and transmitting broadcast programs was accompanied by a certain investment in facilities and money, and customers' diverse demands could not be satisfied due to limitations in such investments.

In an effort to meet these demands, when early stage cable television broadcast stations providing differentiated programs were founded with less investment than that of conventional airwave broadcast stations, an additional device called a set-top box (STB) was required to watch cable TV programs, in addition to an antenna for watching conventional TV programs.

The set-top boxes classified as first generation allow watching diverse cable TV channels, while playing only the passive roles of receiving and relaying broadcast signals unidirectionally. Contrarily, the set-top boxes classified as second generation not only perform the functions of receiving and relaying broadcast signals, but also have their own functions like those of other appliances, thereby providing diverse functions and additional services. A digital set-top box, i.e. a specialized computer actually sending and receiving data through the Internet, contains a web browser and communication protocols such as TCP/IP (Transmission Control Protocol/Internet Protocol).

A cable-card is a core element of OpenCable that has been standardized as a technical specification of cable TV, i.e. a semiconductor chip having subscriber information being mounted on a digital TV set-top box. A cable-card is not a conventional integrated product, but a device separate from a set-top box.

On the other hand, according to Federal Communications Commission (FCC) regulations that have recently come into effect, all cable broadcasting companies in the United States must provide digital cable subscribers with cable-cards from now on. If such a cable-card is installed, digital devices such as a digital TV, a video tape recorder, and/or a computer can be directly connected to the cable without additionally purchasing or renting a digital set-top box.

If a cable-card is inserted into a digital TV where such a cable-card can be attached and detached, a certain module inside the TV communicates bi-directionally with the inserted cable-card, and judges whether the digital TV supports OpenCable, which allows compatibility between the cable-card and the digital TV.

Digital TV's supporting OpenCable or the Open Common Application Platform (OCAP) has been developed and are currently on the market. A digital TV supporting OpenCable must be mounted with a cable-card and use a channel map provided by a head-end.

In the case of a TV that supports OpenCable, even though a user may move from one region to another while subscribing to cable TV, that user does not need to purchase a new device, but need only apply for corresponding cable TV in the new region.

The system information for configuring such a channel map comes from a head-end in the Out-of-Band (OOB) bandwidth, with the cable-card assigning a corresponding frequency within that OOB bandwidth. The contents of the system information for receiving the channel map received in the OOB bandwidth differs by region and head-end.

In the case of digital TV, when a cable-card is inserted, the inserted cable-card's manufacturer number is read. If the read manufacturer number is different from the manufacturer number previously stored, it is recognized that another cable-card has been inserted, and the channel map is deleted. If a cable-card from the same company is used in another region, channels can only be received when the channel map is manually deleted and received again.

Furthermore, in a method of inserting a smart card into a cable-card module such as the SCM cable-card, even in a case where only the smart card is replaced, a user must delete the channel map manually.

SUMMARY OF THE INVENTION

The present invention has been made in order to solve the above drawbacks and other problems in the art. An object of the present invention is to provide an image reproducing apparatus for updating a channel map and a method thereof, in which accurate channel map update conditions are provided using the identification of a broadcast information card, thereby providing users with convenience and increasing update accuracy.

According to one aspect of the present invention for achieving the objects, there is provided an image reproducing apparatus, the apparatus comprising an identification (ID) detector for detecting the ID of a broadcast information card when a broadcast information card is mounted, a comparing unit for comparing the ID of the broadcast information card detected by the detector with the ID of an existing broadcast information card, the latter being received from a broadcast station and stored, a deleting unit for deleting an existing first channel map when the ID of the detected broadcast information card is different from the ID of the existing broadcast information card, and a receiving unit for receiving data including a new second channel map from the broadcast station in place of the first channel map deleted by the deleting unit.

The image reproducing apparatus further comprises a storage unit for storing the first channel map and the second channel map, and a configuring unit for configuring the second channel map.

The ID detector registers the mounted broadcast information card as a new constituent element when the ID of the detected broadcast information card is different from the ID of the existing broadcast information card.

The broadcast information card may be a cable-card, and the broadcast station may be a cable broadcast station.

Further, there is provided an image reproducing apparatus for channel map updating, the apparatus comprising a broadcast information card having a unique identification (ID) and a system controller which detects the ID of the broadcast information card, compares the detected ID of the broadcast information card with an ID of an existing broadcast information card, the ID of the existing broadcast information card being received from a broadcast station and stored, deletes an existing first channel map when the detected ID of broadcast information is different from the ID of the existing broadcast information card, receives data including a new second channel map from the broadcast station in place of the first channel map deleted, stores the first channel map and the second channel map, and configures second channel map.

On the other hand, a method of updating a channel map of the present invention comprises the steps of detecting the ID of the broadcast information card when a broadcast information card is mounted, comparing the ID of the detected broadcast information card with the ID of the existing broadcast information card, the latter being received from a broadcast station and stored, deleting an existing first channel map when the ID of the detected broadcast information card is different from the ID of the existing broadcast information card, and receiving data including a new second channel map from the broadcast station in place of the first channel map deleted by the deleting unit.

The method of updating a channel map further comprises a step of configuring the second channel map.

The method of updating a channel map further comprises a step of pairing that registers the mounted broadcast information card as a constituent element of an image reproducing apparatus mounted with the broadcast information card when the ID of the detected broadcast information card is different from the ID of the existing broadcast information card.

The broadcast information card may be a cable-card, and the broadcast station may be a cable broadcast station.

BRIEF DESCRIPTION OF THE DRAWINGS

The above aspects and features of the present invention will be more apparent by describing exemplary embodiments of the present invention with reference to the accompanying drawings, in which.

DETAILED DESCRIPTION OF EXEMPLARY EMBODIMENTS

Exemplary embodiments of the present invention will be described in greater detail with reference to the accompanying drawings.

Hereafter, a digital television set is described as an image reproducing apparatus for the convenience of explanation. However, it is not to limit the scope of the claims of the invention.

Figure 1:
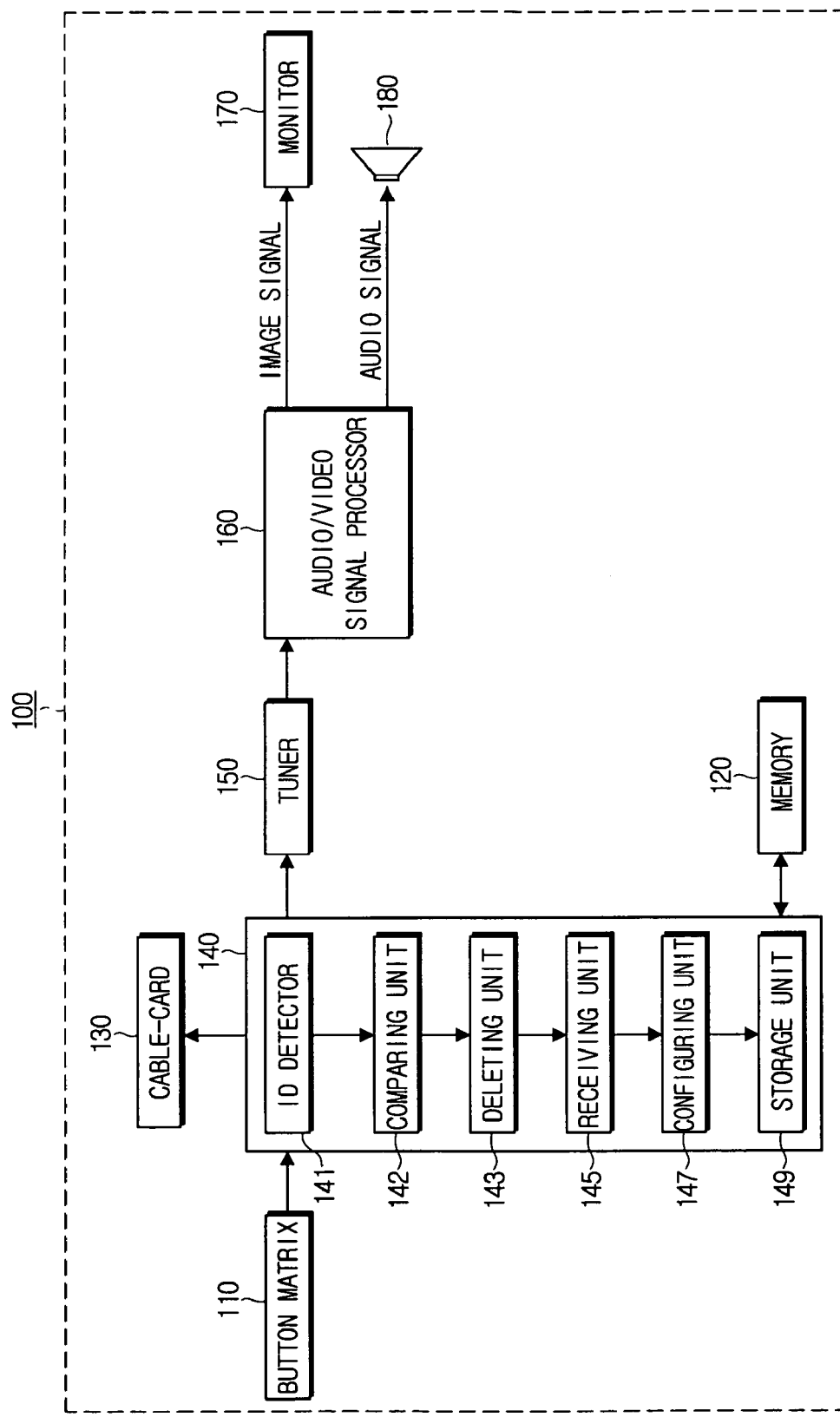
FIG. 1 is a block diagram showing a digital television set according to an exemplary embodiment of the present invention.

FIG. 1 is a block diagram showing a digital television set according to an exemplary embodiment of the invention.

Referring to FIG. 1, a digital television set 100 comprises a button matrix 110, memory 120, a broadcast information card 130, a system controller 140, a tuner 150, an audio/video signal processor 160, a monitor 170, and a speaker 180.

The button matrix 110 is provided so that a user may control the volume, on-off of a power switch, and the like. The button matrix 110 includes a plurality of buttons, and if a user presses a corresponding button, a button code corresponding to that button is transferred. The digital television set 100 is controlled by referring to the functional information that the received button code represents.

The memory 120 stores operating programs that are needed to implement the functions of the digital television set 100, general control programs, and data related to the execution of the programs.

The broadcast information card 130 receives image signals transmitted from broadcast stations. The broadcast information card 130 according to exemplary embodiments of the present invention has a unique identification (ID), and when receiving signals from the broadcast stations, a channel map is updated only in a case where the ID is different from the existing ID that is stored.

In a case where the broadcast supporting the broadcast information card 130 is a cable broadcast, the broadcast information card is a cable-card. Such a broadcast information card 130 can generally be used for various broadcasts such as a satellite broadcast or a terrestrial broadcast.

Even though broadcast information cards 130 are manufactured by the same company, a broadcast information card 130 can have a unique ID different from those of others. Accordingly, even in a case where a user moves to another region and uses a broadcast information card 130 manufactured by the same company, since the ID of the broadcast information card 130 is unique, a second channel map can be received from the broadcast station, and a first channel map of the broadcast information card 130 can be updated conveniently and accurately.

That is, for example, a unique ID is used in a broadcast information card 130 of a digital television set 100 supporting such functions as OpenCable in order to enhance convenience and accuracy when updating the channel map.

In a case where a new broadcast information card 130 is mounted, the first channel map is not updated since the broadcast information card 130 is manufactured by the same company, so that it is unnecessary to delete the existing first channel map and to receive a second channel map, therefore the update condition of the channel map can be accurately known.

The system controller 140 is a core component controlling the system of a digital television set 100 as a whole. The system controller comprises an ID detector 141, a comparing unit 142, a deleting unit 143, a receiving unit 145, a configuring unit 147, and a storage unit 149.

When a user inserts a new broadcast information card 130 into a digital television set 100, the ID detector 141 detects the ID of the broadcast information card 130 in order to perform pairing the broadcast information card 130 with the digital television set 100. The ID of the broadcast information card 130 is stored in the storage unit 149 described below.

In a case where the ID of the detected broadcast information card 130 differs from the ID of the existing broadcast information card 130, the ID detector 141 registers the mounted broadcast information card as a new constituent element, i.e. performs pairing.

When detecting the ID of the broadcast information card 130, the ID detector 141 uses the same method as the one used by the CPU of a computer for retrieving data stored in memory.

Here, a user's name or the like can be used as the ID of the broadcast information card 130, and a unique value such as the IP address of a computer is used.

The comparing unit 142 compares the ID of the broadcast information card 130 detected by the ID detector 141 and the ID of the existing broadcast information card 130 stored in memory in order to judge whether or not they are identical.

If the ID of the newly inserted broadcast information card 130 is different from the ID of the existing broadcast information card 130, the deleting unit 143 deletes the existing first channel map.

When the ID of the existing broadcast information card 130 is different from the ID of the newly inserted broadcast information card 130, and thus the first map needs to be updated, the receiving unit 145 receives a homing signal from a broadcast station.

Here, the homing signal may include not only system information on the new second channel map, but also the information on messages about the update of the broadcast information card 130, homing hours, and firmware update data, that are received from the broadcast station.

The configuring unit 147 reconfigures the second channel map using the received OOB system information data. That is, in receiving the homing signal through the receiving unit 145, the configuring unit 147 updates the channel map with the second channel map.

The second channel map, newly configured and updated by the configuring unit 147, is stored in the storage unit 149, together with the ID of the broadcast information card 130. Thereafter, the second channel map is retrieved in order to perform the operations desired by users. Furthermore, the existing first channel map received from the broadcast station and used by the user before being updated is also stored.

The tuner 150 receives broadcast signals through an antenna (not shown), and the audio/video signal processor 160 processes the transmission signals received through the tuner 150 and outputs audio and video signals.

The monitor 170 displays the video signals received from the audio/video signal processor 160, and the speakers 180 output the audio signals received from the audio/video signal processor 160. The monitor 170 is a constituent element that includes all kinds of certain display means providing a screen in accordance with a digital television set 100, such as a Liquid Crystal Display (LCD).

Here, regardless of its name, the audio/video signal processor 160 is a constituent element including all kinds of such devices needed to process the signals received through the tuner 150, and to output audio signals and video signals used by the monitor 170 and speakers 180. That is, the audio/video signal processor 160 can have diverse functions according to the type of digital television set 100, and diverse processing functions according to whether a Cathode Ray Tube (CRT), or a digital screen is used as a monitor 170.

Figure 2:
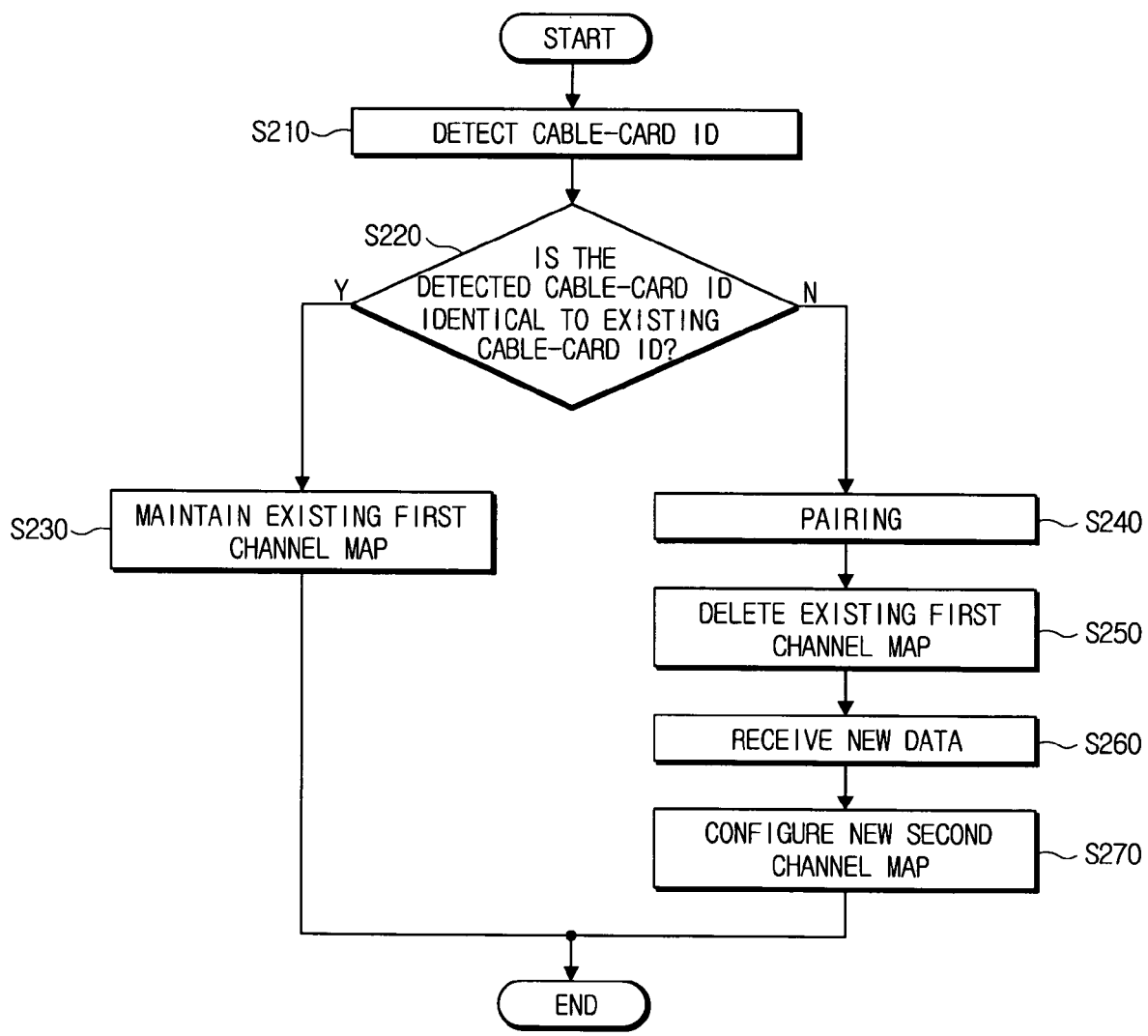
FIG. 2 is a flowchart showing a method of updating a channel map according to an exemplary embodiment of the present invention.

FIG. 2 is a flowchart showing a method of updating a channel map according to an exemplary embodiment of the invention.

Referring to FIGS. 1 and 2, in a case where a user inserts a new broadcast information card 130 into a digital television set 100, the ID of the broadcast information card 130 is detected by the ID detector 141 S210.

The ID of the broadcast information card 130 is detected in order to register the newly inserted broadcast information card 130 as an element of a digital television set 100, i.e. to perform pairing.

The comparing unit 142 compares the ID of the broadcast information card 130 detected by the ID detector 141 and the ID of the existing broadcast information card 130 stored in the storage unit 149 in order to judge whether or not they are identical S220.

As a result of the comparison performed by the comparing unit 142, in a case where the ID of the detected broadcast information card 130 is identical to the ID of the existing broadcast information card 130, the first channel map stored in the existing broadcast information card 130 is maintained S230. The first channel map, which is maintained as is, is stored in the storage unit 149 and is retrieved when a user desires a certain operation to be performed.

On the other hand, as a result of the comparison performed by the comparing unit 142, in a case where the ID of the detected broadcast information card 130 is different from the ID of the existing broadcast information card 130, the pairing operation is performed that confirms the newly mounted broadcast information card 130 as an element of the digital television set 100 according to the invention S240.

Next, the deleting unit 143 deletes the first channel map of the existing broadcast information card 130 stored in the storage unit 149 S250.

After the first channel map is deleted by the deleting unit 143, the receiving unit 145 receives new data from the broadcast station S260. Here, the received new data may include not only the system information on the new second channel map, but also the information on messages about the update of the broadcast information card 130, homing hours, and firmware update data, that are received from the broadcast station.

The second channel map is configured using the system information included in the received data S270. That is, the channel map is updated using the system information included in the received data.

Accordingly, the channel map update condition of the broadcast information card 130 can be provided accurately using the ID of the broadcast information card 130.

On the other hand, as described above, in a case where the broadcast supporting the broadcast information card 130 is a cable broadcast, the broadcast information card is a cable-card. Furthermore, such a broadcast information card 130 can be generally used for various broadcasts such as a satellite broadcast or a terrestrial broadcast.

As explained above, according to exemplary embodiments of the present invention, a broadcast information card has a unique ID regardless of its manufacturer's number. Therefore, when the channel map of the broadcast information card is to be updated, accurate update conditions can be proposed, thereby providing users with convenience and increased update accuracy.

The foregoing exemplary embodiments and advantages are merely exemplary and are not to be construed as limiting the present invention. The present teachings can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image reproducing apparatus for channel map updating, the apparatus comprising:

an identification (ID) detector which detects an ID of a broadcast information card when the broadcast information card is mounted;

a comparing unit which compares the ID of the broadcast information card detected by the detector with an ID of an existing broadcast information card, wherein the ID of the existing broadcast information card is stored in the image reproducing apparatus;

a deleting unit which deletes an existing first channel map when the ID of the detected broadcast information card is different from the ID of the existing broadcast information card; and a receiving unit which receives data including a new second channel map from the broadcast station in place of the first channel map deleted by the deleting unit.

2. The apparatus as claimed in claim 1, further comprising:

a storage unit which stores the first channel map and the second channel map; and a configuring unit which configures the second channel map.

3. The apparatus as claimed in claim 1, wherein the ID detector registers the mounted broadcast information card as a new constituent element when the ID of the detected broadcast information card is different from the ID of the existing broadcast information card.

4. The apparatus as claimed in claim 1, wherein the broadcast information card is a cable-card, and the broadcast station is a cable broadcast station.

5. An image reproducing apparatus for channel map updating, the apparatus comprising:

a broadcast information card having a unique identification (ID); and a system controller which detects the ID of the broadcast information card, compares the detected ID of the broadcast information card with an ID of an existing broadcast information card, the ID of the existing broadcast information card being received from a broadcast station and stored, deletes an existing first channel map when the detected ID of broadcast information is different from the ID of the existing broadcast information card, receives data including a new second channel map from the broadcast station in place of the first channel map deleted, stores the first channel map and the second channel map, and configures second channel map.

6. A method of updating a channel map, the method comprising:

detecting, by an identification detector, an ID of a broadcast information card when a broadcast information card is mounted;

comparing the ID of the detected broadcast information card with an ID of the existing broadcast information card, the ID of the existing broadcast information card being received from a broadcast station and stored;

deleting an existing first channel map when the ID of the detected broadcast information card is different from the ID of the existing broadcast information card; and receiving data including a new second channel map from the broadcast station in place of the first channel map deleted by the deleting unit.

7. The method as claimed in claim 6, further comprising: configuring the second channel map.

8. The method as claimed in claim 6, further comprising:

pairing by registering the mounted broadcast information card as a constituent element of an image reproducing apparatus mounted with the broadcast information card when the ID of the detected broadcast information card is different from the ID of the existing broadcast information card.

9. The method as claimed in claim 6, wherein the broadcast information card is a cable-card, and the broadcast station is a cable broadcast station.

10. The apparatus as claimed in claim 1, wherein the ID is an ID uniquely assigned to of the broadcast information card.

* * * * *